(12) United States Patent
Hsu et al.

(10) Patent No.: US 10,416,367 B2
(45) Date of Patent: Sep. 17, 2019

(54) FRONT LIGHT MODULE AND DISPLAY MODULE

(71) Applicant: E Ink Holdings Inc., Hsinchu (TW)

(72) Inventors: Chin-Ju Hsu, Hsinchu (TW); Yu-Nan Pao, Hsinchu (TW); I-Jeng Chen, Hsinchu (TW); Sheng-Chieh Tai, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 188 days.

(21) Appl. No.: 14/989,804

(22) Filed: Jan. 7, 2016

(65) Prior Publication Data

US 2016/0223734 A1 Aug. 4, 2016

Related U.S. Application Data

(60) Provisional application No. 62/103,075, filed on Jan. 14, 2015.

(30) Foreign Application Priority Data

Aug. 24, 2015 (TW) .............................. 104127457 A

(51) Int. Cl.
*F21V 8/00* (2006.01)
(52) U.S. Cl.
CPC .......... *G02B 6/0018* (2013.01); *G02B 6/0036* (2013.01); *G02B 6/0061* (2013.01); *G02B 6/0073* (2013.01)
(58) Field of Classification Search
CPC .. G02B 6/0018; G02B 6/0036; G02B 6/0073; G02B 6/0013; G02B 6/0015;
(Continued)

(56) References Cited

U.S. PATENT DOCUMENTS 5,070,431 A * 12/1991 Kitazawa ............. G02B 6/0021
362/23.15
6,779,902 B2 * 8/2004 Cha ....................... G02B 6/0013
362/23.16
(Continued)

FOREIGN PATENT DOCUMENTS

CN 1758074 4/2006
CN 1996059 7/2007
(Continued)

OTHER PUBLICATIONS

Printed page/Article from https://www.mathisfun.com.geometry/parallel-lines.html, copyright @2017 Mathisfun.com.*
(Continued)

*Primary Examiner* — Peggy A Neils
(74) *Attorney, Agent, or Firm* — JCIPRNET

(57) ABSTRACT

A front light module including a light guide plate and a light source is provided. The light guide plate includes a first surface, a second surface and a light entering surface. The second surface is opposite the first surface. The light entering surface has at least one area that is adjacent to the first surface and the second surface. The light source is disposed beside the light entering surface and is configured to illuminate the light guide plate. The at least one area and an optical axis of the light source form a first angle. The first angle is less than 90 degrees. A display module is also provided.

16 Claims, 14 Drawing Sheets

(58) Field of Classification Search
CPC .... G02B 6/002; G02B 6/0028; G02B 6/0091; G02F 1/133615; F21Y 2115/10; F21K 9/00; F21V 9/16
See application file for complete search history.

(56) References Cited

U.S. PATENT DOCUMENTS

| | | | | |
|---|---|---|---|---|
| 6,940,570 | B1 | 9/2005 | Sumida et al. | |
| 7,223,006 | B2 | 5/2007 | Sugiura | |
| 7,325,958 | B2* | 2/2008 | Yang | G02B 6/0016 362/619 |
| 8,070,346 | B2 | 12/2011 | Maeda et al. | |
| 8,480,284 | B2* | 7/2013 | Lin | G02B 6/0021 362/611 |
| 8,807,791 | B2* | 8/2014 | Huang | H05B 33/0842 362/217.05 |
| 9,121,975 | B2* | 9/2015 | Niu | G02B 6/0011 |
| 9,201,190 | B2* | 12/2015 | Tai | G02B 6/0073 |
| 9,335,580 | B2* | 5/2016 | Tamaki | G02F 1/133514 |
| 9,651,732 | B2* | 5/2017 | Huang | F21K 9/20 |
| 2003/0193631 | A1* | 10/2003 | Chiou | G02B 6/0013 349/65 |
| 2004/0174694 | A1* | 9/2004 | Huang | H04N 1/02815 362/621 |
| 2007/0086208 | A1* | 4/2007 | Lee | G02B 6/0011 362/613 |
| 2007/0091642 | A1* | 4/2007 | Lee | G02B 6/002 362/621 |
| 2013/0258705 | A1 | 10/2013 | Pao et al. | |
| 2016/0149098 | A1* | 5/2016 | Song | G02B 6/0026 362/612 |

FOREIGN PATENT DOCUMENTS

| | | |
|---|---|---|
| CN | 102043276 | 5/2011 |
| CN | 102069651 | 5/2011 |
| CN | 102767748 | 11/2012 |
| CN | 103839937 | 6/2014 |
| TW | M292707 | 6/2006 |
| TW | 201011404 | 3/2010 |
| TW | 201437702 | 10/2014 |

OTHER PUBLICATIONS

"Office Action of Taiwan Counterpart Application", dated Sep. 19, 2016, p. 1-p. 9, in which the listed references were cited.
"Office Action of China Counterpart Application," dated Nov. 1, 2017, p. 1-p. 9, in which the listed references were cited.
Office Action of China Counterpart Application, dated Jan. 17, 2019, pp. 1-10.

* cited by examiner

FRONT LIGHT MODULE AND DISPLAY MODULE

CROSS-REFERENCE TO RELATED APPLICATION

This application claims the priority benefits of U.S. provisional application Ser. No. 62/103,075, filed on Jan. 14, 2015 and Taiwan application serial no. 104127457, filed on Aug. 24, 2015. The entirety of each of the above-mentioned patent applications is hereby incorporated by reference herein and made a part of this specification.

BACKGROUND OF THE INVENTION

Field of the Invention

The invention is related to an optical module and a display module, and particularly to a front light module and a display module.

Description of Related Art

In a general reflective display design, a light guide plate is attached above a display module, and a light source is disposed on a lateral side of the light guide plate. Light emitted from the light source may travel within the light guide plate by total reflection, and is refracted toward the display module by a microstructure destroying the total reflection in a visible area. The light refracted toward the display module is then reflected by the display module to a viewer.

Currently, in a white light-emitting diode (LED), an LED chip emitting blue light excites yellow phosphor, and the blue light is mixed with the yellow light generated by the excitation to generate white light. The blue light and the yellow light have different light divergence angles. Generally, the blue light is emitted from the chip and reflected by a package cup for light emission, and has a smaller light divergence angle. The yellow light is generated due to excitation of the phosphor, and has a greater divergence angle.

Due to the difference in divergence angle between the blue light band and the yellow light band, and due to a natural stacked design of a reflective front light module and a market demand for lightweight and compact products, a light coupling region has to be shortened. In a general reflective display, directly in front of the light source, due to its greater divergence angle, the yellow light more easily enters the display module through an optical adhesive layer before entering the visible area. As a result, a part of the yellow light is absorbed so that an image in relatively cool white is likely to be presented directly in front of the light source in the visible area. In addition, obliquely in front of the light source, the whole light divergence angle (including the blue light divergence angle and the yellow light divergence angle) is smaller than that directly in front of the light source, and light emergence is not easier. As a result, the proportion of the yellow light absorbed before entering the visible area is considerably reduced, so that an image in relatively warm white is likely to be presented obliquely in front of the light source in the visible area. Thus, on the side of the light guide plate closer to the light source, a problem of nonuniformity of color of the emitted light is likely to occur.

SUMMARY OF THE INVENTION

An embodiment of the invention provides a front light module capable of making a surface light source uniform in color on a light entering side.

An embodiment of the invention provides a display module having a display frame uniform in color on a light entering side.

One embodiment of the invention provides a front light module including a light guide plate and a light source. The light guide plate includes a first surface, a second surface and a light entering surface. The second surface is opposite the first surface. The light entering surface has one area adjacent to the first surface and the second surface. The light source is disposed beside the light entering surface and is configured to illuminate the light guide plate. The area and an optical axis of the light source form a first angle. The first angle is less than 90 degrees.

In one embodiment of the invention, the first angle ranges from 50 to 85 degrees.

In one embodiment of the invention, the second surface is parallel to the optical axis of the light source. The light entering surface and the second surface form a second angle. The second angle ranges from 50 to 85 degrees.

In one embodiment of the invention, the first surface and the second surface are substantially parallel to each other.

In one embodiment of the invention, the light source is a light-emitting diode (LED).

In one embodiment of the invention, the light entering surface is a plane.

In one embodiment of the invention, the light entering surface includes a first microstructure protruding from or recessed into the light entering surface. The first microstructure includes an area.

In one embodiment of the invention, the first microstructure has a shape of a portion of a cylinder, a portion of a prism or a portion of a cone.

In one embodiment of the invention, the light entering surface further includes a second microstructure protruding from or recessed into the light entering surface. The first microstructure and the second microstructure are alternately arranged in a row. The first microstructure has a shape of a portion of a cone, a vertex of the cone being connected to the first surface and a bottom surface of the cone being connected to the second surface. The second microstructure has a shape of a portion of a cone, a vertex of the cone being connected to the second surface and a bottom surface of the cone being connected to the first surface.

In one embodiment of the invention, the first microstructure is a plurality of first microstructures. The plurality of first microstructures are connected or not connected to one another.

One embodiment of the invention provides a display module including a reflective display panel, a light guide plate and a light source. The light guide plate is disposed on the reflective display panel. The light guide plate includes a first surface, a second surface and a light entering surface. The second surface is opposite the first surface. One of the first surface and the second surface faces the reflective display panel and the other faces away from the reflective display panel. The light entering surface has an area adjacent to the first surface and the second surface. The light source is disposed beside the light entering surface and is configured to illuminate the light guide plate. The area and an optical axis of the light source form a first angle. The first angle is less than 90 degrees.

In one embodiment of the invention, the display module further includes an adhesive layer disposed between the reflective display panel and the light guide plate and configured to fix the reflective display panel and the light guide plate. The adhesive layer has a refractive index smaller than that of the light guide plate.

In one embodiment of the invention, the one of the first surface and the second surface that faces the reflective display panel includes a plurality of microstructures. The plurality of microstructures are protruding from or recessed into the one of the first surface and the second surface.

Based on the above, the light entering surface of the light guide plate of the front light module according to an embodiment of the invention has an area adjacent to the first surface and the second surface of the light guide plate. The area and the optical axis of the light source form the first angle. The first angle is less than 90 degrees. Therefore, the front light module is capable of making a surface light source uniform in color on the light entering side. In addition, the light entering surface of the light guide plate of the display module according to an embodiment of the invention has an area adjacent to the first surface and the second surface of the light guide plate. The area and the optical axis of the light source form the first angle. The first angle is less than 90 degrees. Therefore, a display frame of the display module is uniform in color on the light entering side.

To make the above features and advantages of the invention more comprehensible, embodiments accompanied with drawings are described in detail as follows.

DETAILED DESCRIPTION OF DISCLOSED EMBODIMENTS

Figure 1:
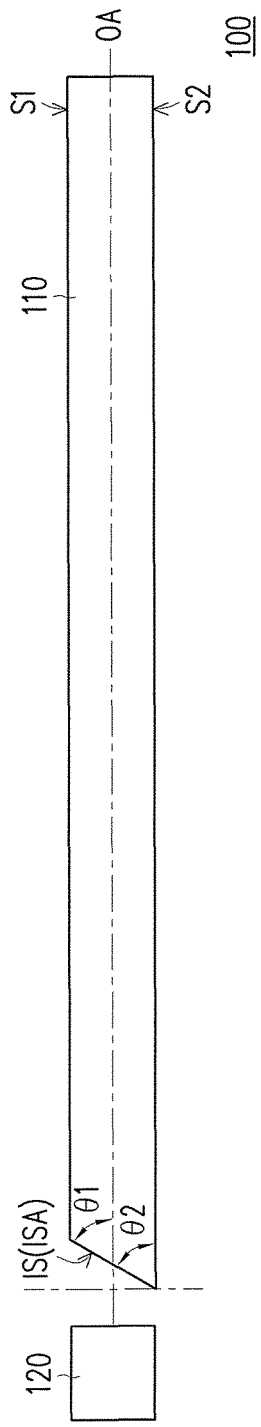
FIG. 1 is a schematic side view of a front light module according to an embodiment of the invention.

FIG. 1 is a schematic side view of a front light module according to an embodiment of the invention. Please refer to FIG. 1. In the present embodiment, a front light module 100 includes a light guide plate 110 and a light source 120. The light guide plate 110 includes a first surface S1, a second surface S2 and a light entering surface IS. The second surface S2 is opposite the first surface S1. The light entering surface IS is adjacent to the first surface S1 and the second surface S2. The light entering surface IS has an area ISA adjacent to the first surface S1 and the second surface S2. Specifically, the first surface S1 and the second surface S2 are substantially parallel to each other. However, in another embodiment, the first surface S1 and the second surface S2 may not be parallel to each other. In addition, the light entering surface IS in the present embodiment is a plane. However, in another embodiment, the light entering surface IS may be, e.g., a concave surface or a convex surface. The light entering surface IS may also be, e.g., an arc surface, a circular arc surface, a paraboloid or a freeform surface. The invention is not limited thereto.

In the present embodiment, the area ISA is an extension between the first surface S1 and the second surface S2. In other words, the first surface S1, the area ISA and the second surface S2 in the present embodiment are continuous. In some other embodiments, the area ISA may be, e.g., a portion of the extension between the first surface S1 and the second surface S2. In other words, the first surface S1, the area ISA and the second surface S2 may also be, e.g., discontinuous. In addition, in the present embodiment, the area ISA is an entire surface of the light entering surface IS. In another embodiment, the light entering surface IS may also have a plurality of areas ISA that are connected to or separated from one another. In addition, the areas ISA may occupy the entire surface of the light entering surface IS, or may occupy a portion of the surface of the light entering surface IS. The invention is not limited thereto.

In the present embodiment, the light source 120 is disposed beside the light entering surface IS and configured to illuminate the light guide plate 110. The area ISA and an optical axis OA of the light source 120 form a first angle θ1. The first angle θ1 is less than 90 degrees. Specifically, the first angle θ1 ranges from 50 to 85 degrees. Preferably, the first angle θ1 ranges from 70 to 80 degrees. In addition, in the present embodiment, the light entering surface IS and the second surface S2 form a second angle θ2 less than 90 degrees. Specifically, the second angle θ2 ranges from 50 to 85 degrees. Preferably, the second angle θ2 ranges from 70 to 80 degrees. In the present embodiment, the second surface S2 and the optical axis OA of the light source 120 are parallel to each other. In other words, light emitted from the light source 120 horizontally enters the light guide plate 110. However, in some other embodiments, the second surface S2 and the optical axis OA of the light source 120 may not be parallel to each other. In other words, the light emitted from the light source 120 may not horizontally enter the light guide plate 110. In addition, the light source 120 and the light guide plate 110 may have a gap therebetween or may be in contact with each other. In addition, in the present embodiment, the light source 120 of the front light module 100 is a light-emitting diode (LED) device that may include a single LED chip or may include a plurality of LED chips. In other embodiments, the light source 120 of the front light module 100 may be other light source or may be a combination of different light sources. The invention is not limited thereto.

Figure 2A:
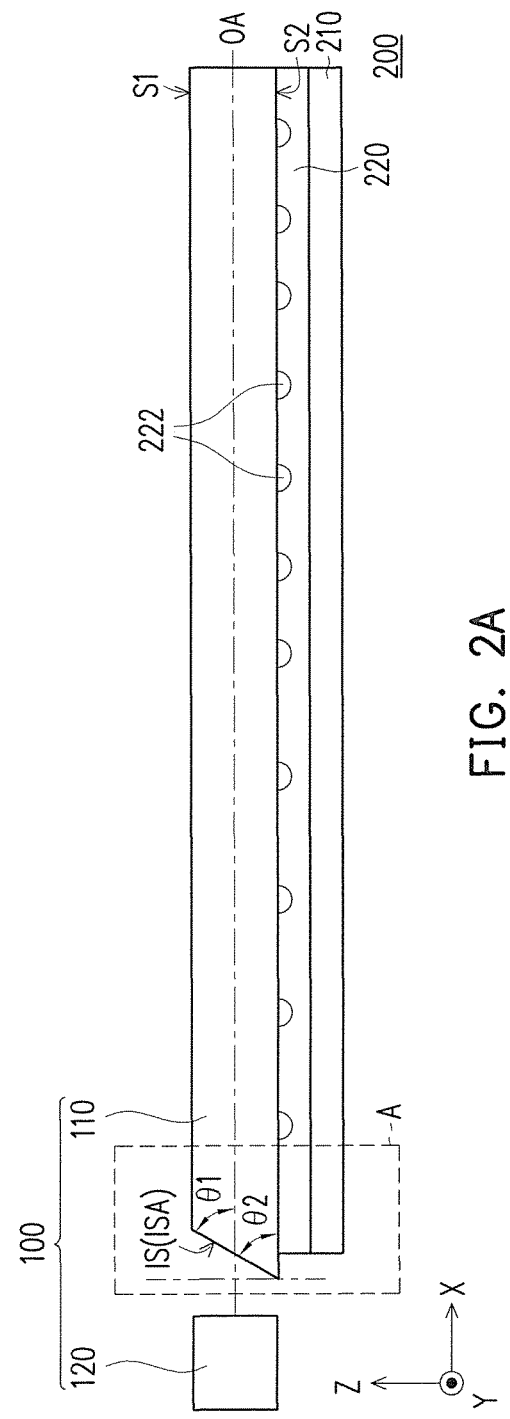
FIG. 2A is a schematic side view of a display module according to an embodiment of the invention.

FIG. 2A is a schematic side view of a display module according to an embodiment of the invention. Please refer to FIG. 2A. In the present embodiment, a display module 200 includes a reflective display panel 210, a light guide plate 110 and a light source 120. The light guide plate 110 is disposed on the reflective display panel 210. The arrangement of the light guide plate 110 and the light source 120 is the same as that in the front light module 100 in the aforementioned embodiment shown in FIG. 1. Details of the light guide plate 110 and the light source 120 may be obtained by referring to the description of the light guide plate 110 and the light source 120 of the front light module 100 in the embodiment shown in FIG. 1, and thus are not repeated herein. In the present embodiment, the display module 200 is deemed to be located in a space formed by the X-axis, the Y-axis and the Z-axis, wherein the X-axis is substantially parallel to the optical axis OA of the light source 120 and extends along a horizontal direction. The Z-axis is perpendicular to the X-axis and extends along a vertical direction. In addition, the Y-axis is perpendicular to both the X-axis and the Z-axis.

In the present embodiment, one of the first surface S1 and the second surface S2 of the light guide plate 110 faces the reflective display panel 210, and the other faces away from the reflective display panel 210. Specifically, the second surface S2 faces the reflective display panel 210, and the first surface S1 faces away from the reflective display panel 210. In addition, in the present embodiment, the display module 200 further includes an adhesive layer 220 disposed between the reflective display panel 210 and the light guide plate 110 and configured to fix the reflective display panel 210 and the light guide plate 110. Specifically, the adhesive layer 220 has a refractive index smaller than that of the light guide plate 110. The adhesive layer 220 is formed of, e.g., an optically clear adhesive (OCA), or other kinds of adhesive materials. In addition, the one of the first surface S1 and the second surface S2 that faces the reflective display panel 210 includes a plurality of microstructures 222. The microstructures 222 are protruding from or recessed into at least one of the first surface S1 and the second surface S2.

In the present embodiment, the second surface S2 that faces the reflective display panel 210 includes a plurality of microstructures 222 protruding from or recessed into the second surface S2. Specifically, the microstructures 222 are, e.g., disposed in a specified area on the second surface S2. In the present embodiment, since the refractive index of the adhesive layer 220 is smaller than that of the light guide plate 110, after a light beam emitted from the light source 120 enters the light guide plate 110 from the light entering surface IS of the light guide plate 110, the light beam travels within the light guide plate 110 by total reflection. When the light beam that travels within the light guide plate 110 by total reflection enters a visible area of the display module 200 corresponding to the position of the aforementioned specified area, the total reflection is destroyed by the microstructures 222 so that the light beam that initially travels within the light guide plate 110 passes through the microstructures 222 to be refracted toward the reflective display panel 210. By means of the reflective display panel 210, the display module 200 reflects the light beam to a viewer so as to achieve an effect of displaying a frame. Specifically, the microstructures 222 may have different shapes depending on different requirements of the display frame. The invention is not limited thereto. In addition, for clear illustration of the microstructures 222 being arranged on the second surface S2, the microstructures 222 are shown enlarged in FIG. 2A. Specifically, the microstructures 222 and the other components are illustrated in appropriate size in order to clearly describe their structures, and the illustration does not limit the size of the components.

Figure 2B:
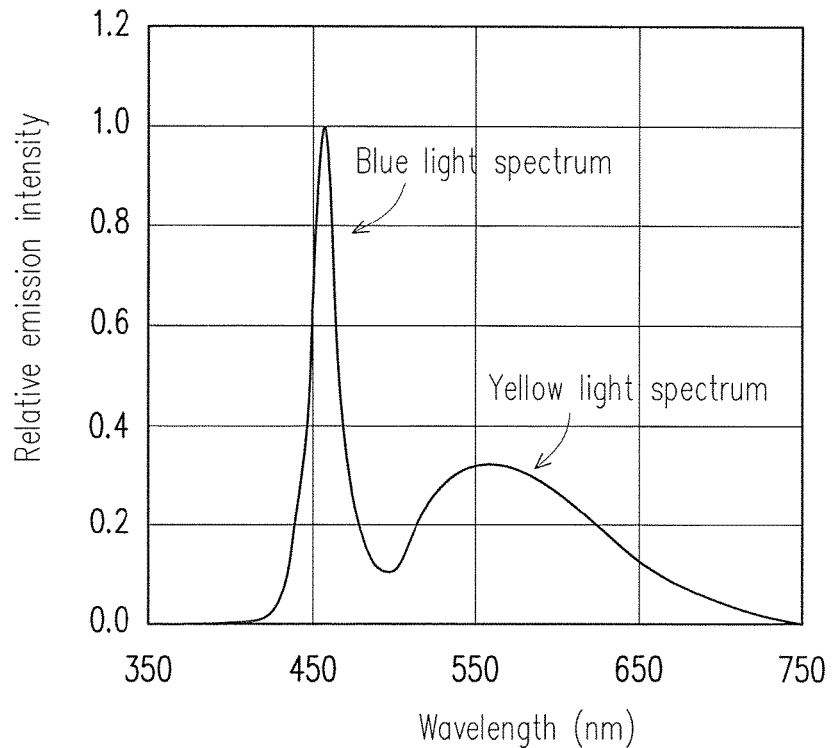
FIG. 2B is a luminescence spectrum of an LED device in the embodiment shown in FIG. 2A.

FIG. 2B is a luminescence spectrum of an LED device in the embodiment shown in FIG. 2A. Please refer to FIG. 2B. In FIG. 2B, the horizontal axis indicates wavelength in units of nanometer (nm), and the vertical axis indicates relative emission intensity. Generally, in a white LED, an LED chip emitting blue light excites yellow phosphor, and the blue light is mixed with the yellow light generated by the excitation to generate white light. Therefore, from the luminescence spectrum of the LED device, a blue light spectrum having a shorter wavelength and a yellow light spectrum having a longer wavelength are seen. Specifically, the light source 120 in the embodiment shown in FIG. 2A is, e.g., the white LED device shown in FIG. 2B, or a white LED device having any other kind of spectrum. In addition, the light source 120 may also be an LED device for emitting red light, blue light, green light or any other colored light. The invention is not limited thereto.

Figure 2C:
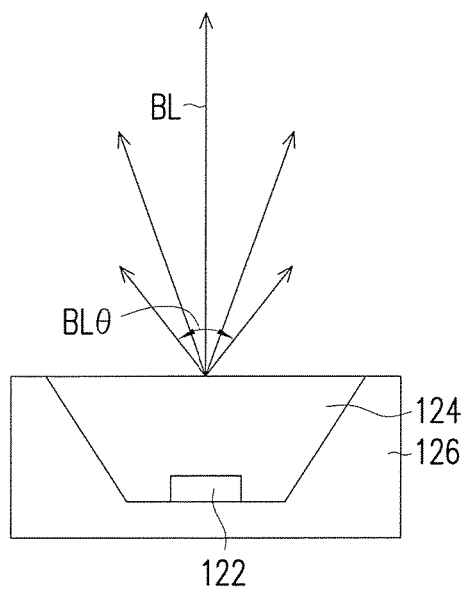
FIG. 2C schematically illustrates directions in which blue light of the LED device in the embodiment shown in FIG. 2A is emitted.
Figure 2D:
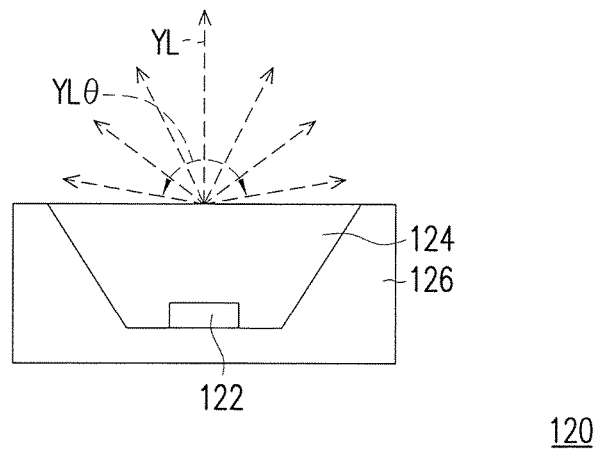
FIG. 2D schematically illustrates directions in which yellow light of the LED device in the embodiment shown in FIG. 2A is emitted.

FIG. 2C schematically illustrates directions in which the blue light of the LED device in the embodiment shown in FIG. 2A is emitted. FIG. 2D schematically illustrates directions in which the yellow light of the LED device in the embodiment shown in FIG. 2A is emitted. Please refer to FIGS. 2C and 2D. In the present embodiment, the light source 120 is, e.g., the white LED device shown in FIG. 2B. The light source 120 includes a light-emitting chip 122, a wavelength converting material 124 and a housing 126. The light-emitting chip 122 is disposed in a recessed accommodation space in the housing 126, and the wavelength converting material 124 covers the light-emitting chip 122. The light-emitting chip 122 is, e.g., an LED chip emitting blue light, and the wavelength converting material 124 includes, e.g., yellow phosphor. The light-emitting chip 122 is configured to emit a blue light BL, wherein a part of the blue light BL excites the wavelength converting material 124 (e.g., yellow phosphor) so that the excited wavelength converting material 124 emits a yellow light YL outward. Another part of the blue light BL passes through the wavelength converting material 124 to be emitted outward. Specifically, the blue light BL emitted from the LED device and the yellow light YL generated by excitation are mixed together to generate white light. The blue light BL emitted from the LED device forms a blue light divergence angle BLθ (as shown in FIG. 2C). Meanwhile, the yellow light YL emitted from the LED device forms a yellow light divergence angle YLθ (as shown in FIG. 2D). Since the blue light BL is emitted from the light-emitting chip 122, and a part of lateral blue light BL is reflected by the housing 126 to be guided outside, the blue light divergence angle BLθ is noticeably smaller than the yellow light divergence angle YLθ. In addition, since the yellow light YL is generated due to excitation of the yellow phosphor, the yellow light divergence angle YLθ is wider than the blue light divergence angle BLθ.

Figure 2E:
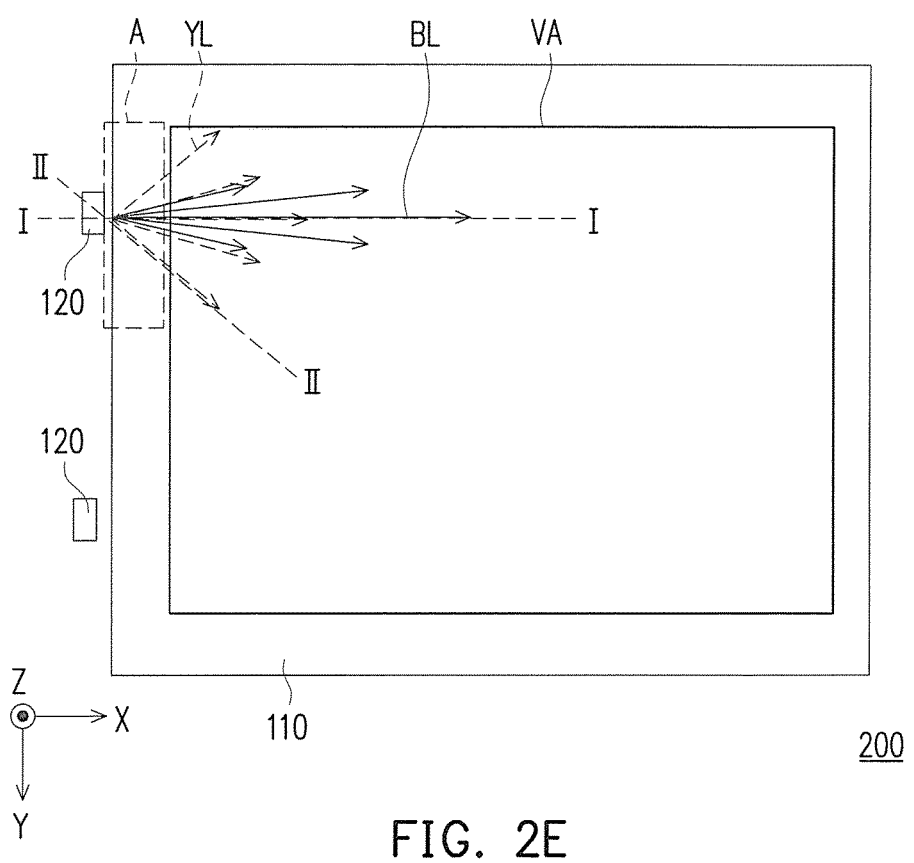
FIG. 2E is a schematic top view of the display module in the embodiment shown in FIG. 2A.

FIG. 2E is a schematic top view of the display module in the embodiment shown in FIG. 2A. Please refer to FIG. 2E. In the present embodiment, the display module 200 includes two light sources 120. The light sources 120 are disposed beside the light entering surface IS of the light guide plate 110 and configured to illuminate the light guide plate 110. In some other embodiments, the display module 200 may also include a plurality of light sources 120. Specifically, the light source 120 may be provided in an appropriate number according to display requirements. The invention is not limited thereto. In the present embodiment, the display module 200 includes a visible area VA. When the light beam that travels within the light guide plate 110 by total reflection enters the visible area VA, the light beam is refracted toward the reflective display panel 210 by means of the microstructures 222 of the light guide plate 110. Specifically, the blue light BL and the yellow light YL emitted from the light source 120 enter the light guide plate 110 through the light entering surface IS. The yellow light YL has a divergence angle greater than that of the blue light BL.

Figure 2F:
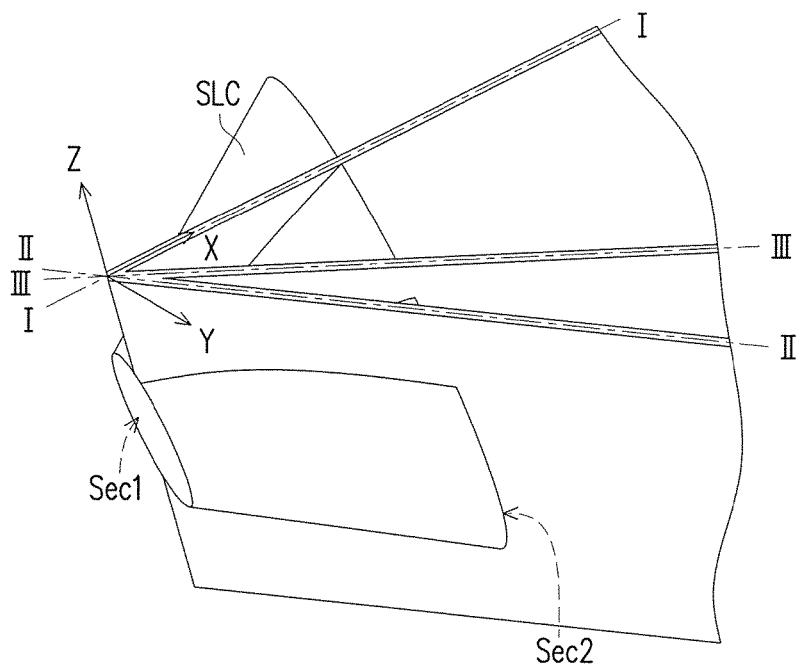
FIGS. 2F to 2G are simulation diagrams illustrating light divergence of a light source in the embodiment shown in FIG. 2A at cross sections at different angles.
Figure 2G:
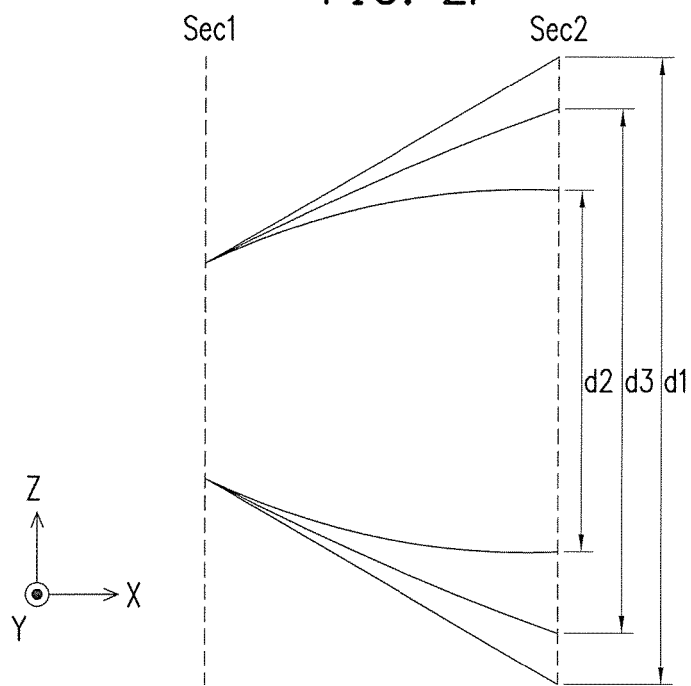

FIGS. 2F to 2G are simulation diagrams illustrating light divergence of a light source in the embodiment shown in FIG. 2A at cross sections at different angles. Please refer to FIGS. 2F and 2G. In the present embodiment, a light cone SLC is, e.g., a light cone simulating that emitted from the light source 120, and is used to illustrate how the light emitted from the light source 120 diverges. Specifically, the cross section of the light cone SLC along line I-I shows the situation where the light source 120 emits light from the center; the cross section of the light cone SLC along line II-II shows the situation where the light source 120 laterally emits light at a greater angle; and the cross section of the light cone SLC along line shows the situation where the light source 120 laterally emits light at a smaller angle. By comparison among the cross sections of the light cone SLC along lines I-I, II-II and III-III, the situations where the light source 120 emits light from the center and laterally are known. In the present embodiment, the light source 120 emits light from a fixed section Sec1. The cross sections of the light cone SLC formed by light emission of the light source 120 from the center and in a lateral direction form different light divergence widths on a section Sec2. Specifically, the cross section of the light cone SLC along line I-I corresponds to a light divergence width d1 on the section Sec2, the cross section of the light cone SLC along line II-II corresponds to a light divergence width d2 on the section Sec2 is d2, and the cross section of the light cone SLC along line III-III corresponds to a light divergence width d3 on the section Sec2. In the present embodiment, since the light emission of the light source 120 from the center has a greater degree of light divergence than the light emission of the light source 120 in the lateral direction, d1>d3>d2. However, in other embodiments, based on different light divergence designs of a light source, the degrees of light divergence in the light emission of the light source from the center and in the lateral direction may have a relationship different from that in the present embodiment, which is not limited in the invention.

Figure 2H:
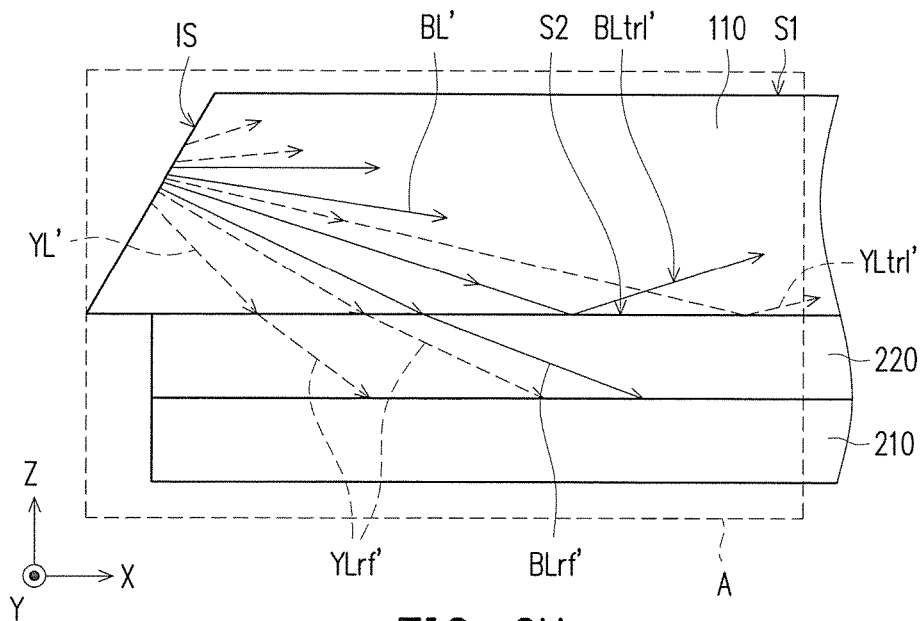
FIG. 2H is a schematic cross-sectional view of the display module in the embodiment shown in FIG. 2A along line I-I of the light source shown in FIG. 2F.

FIG. 2H is a schematic cross-sectional view of the display module in the embodiment shown in FIG. 2A along line I-I of the light source shown in FIG. 2F. FIG. 2H illustrates a portion of a non-visible area A of the display module 200 corresponding to FIG. 2A and FIG. 2E, and the portion of the non-visible area A is not in the visible area VA. Please refer to FIG. 2H. In the present embodiment, since the second angle θ2 formed by the light entering surface IS and the second surface S2 is less than 90 degrees, the light entering surface IS is inclined toward the second surface S2. A horizontal incident light from the light source 120 passes through the light entering surface IS inclined toward the second surface S2 and is then deflected toward the second surface S2. Specifically, a blue light BL' and a yellow light YL' emitted from the light source 120 enter the light entering surface IS of the light guide plate 110 and then are deflected toward the second surface S2. Meanwhile, the blue light BL' and the yellow light YL' diverge in the light guide plate 110 at different divergence angles.

In the present embodiment, the divergence angle at which the yellow light YL' diverges in the light guide plate 110 is greater than the divergence angle at which the blue light BL' diverges in the light guide plate 110. A part of the yellow light YL' enters the adhesive layer 220 after refraction, so as to form an incident yellow light YLrf'. In addition, a part of the yellow light YL' is incident on the adhesive layer 220 at an incident angle greater than a critical angle, so as to form a total-reflection yellow light YLtrl'. On the other hand, in the present embodiment, a part of the blue light BL' forms an incident blue light BLrf' and a part of the blue light BL' forms a total-reflection blue light BLtrl'. Specifically, after entering the adhesive layer 220, at least a part of the incident yellow light YLrf' and the incident blue light BLrf' is absorbed by the adhesive layer 220, so that the incident yellow light YLrf' and the incident blue light BLrf' can hardly travel within the light guide plate 110 by total reflection anymore. In addition, the total-reflection yellow light YLtrl' and the total-reflection blue light BLtrl' are able to travel within the light guide plate 110 by total reflection, and reach a position in the light guide plate 110 corresponding to the visible area VA of the display module 200. Next, the total-reflection yellow light YLtrl' and the total-reflection blue light BLtrl' are refracted toward the reflective display panel 210 by means of the microstructures 222 located in the position in the light guide plate 110. By means of the reflective display panel 210, the display module 200 reflects the light beam to the viewer so as to achieve the effect of displaying a frame.

In the present embodiment, although the yellow light divergence angle YLθ of the light source 120 is greater than the blue light divergence angle BLθ, a proportion of the incident yellow light YLrf' in the yellow light YL' is close to that of the incident blue light BLrf' in the blue light BL', and a proportion of the total-reflection yellow light YLtrl' in the yellow light YL' is close to that of the total-reflection blue light BLtrl' in the blue light BL'. Therefore, an image presented directly in front of the light source 120 in the visible area VA of the display module 200 is neither warm whitish nor cool whitish.

Figure 2I:
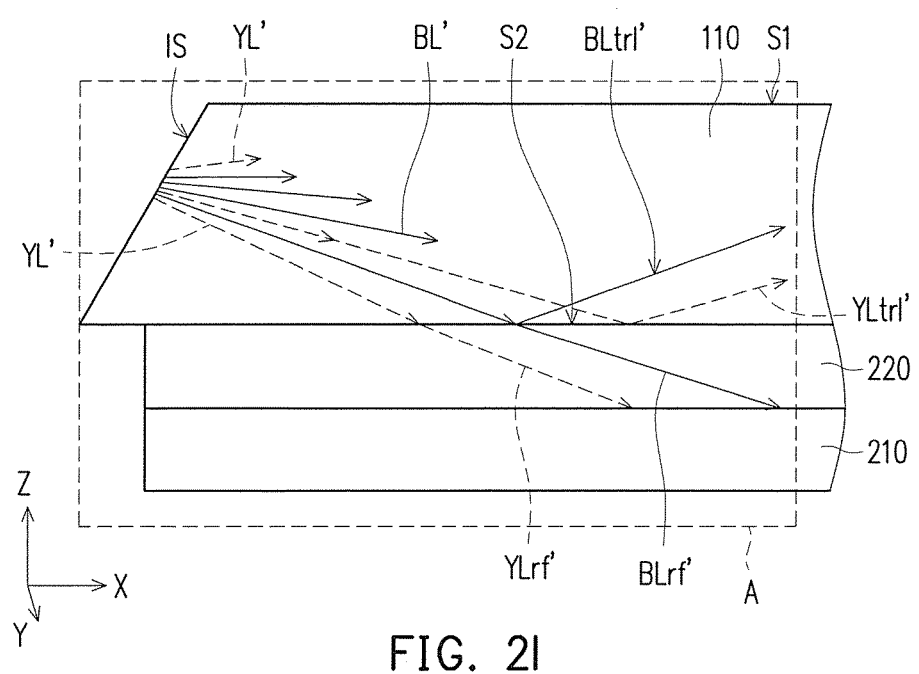
FIG. 2I is a schematic cross-sectional view of the display module in the embodiment shown in FIG. 2A along line II-II of the light source shown in FIG. 2F.

FIG. 2I is a schematic cross-sectional view of the display module in the embodiment shown in FIG. 2A along line II-II of the light source shown in FIG. 2F. Similar to FIG. 2H, FIG. 2I illustrates the portion of the non-visible area A of the display module 200 corresponding to FIG. 2A and FIG. 2E, and the portion of the non-visible area A is not in the visible area VA. Please refer to FIG. 2I. In the present embodiment, since the second angle θ2 formed by the light entering surface IS and the second surface S2 is less than 90 degrees, the light entering surface IS is inclined toward the second surface S2. A horizontal incident light from the light source 120 passes through the light entering surface IS inclined toward the second surface S2 and is then deflected toward the second surface S2. Specifically, after entering the light entering surface IS of the light guide plate 110, the blue light BL' and the yellow light YL' are deflected toward the second surface S2, and diverge in the light guide plate 110 at different divergence angles.

In the present embodiment, the light emission of the light source 120 from the center has a greater degree of light divergence than the light emission of the light source 120 in the lateral direction. Therefore, the blue light divergence angle and the yellow light divergence angle of the light source 120 corresponding to the lateral light emission are both smaller than those corresponding to the light emission from the center. Specifically, in the lateral light emission of the light source 120 in FIG. 2I, the divergence angle at which the yellow light YL' diverges in the light guide plate 110 is greater than the divergence angle at which the blue light BL' diverges in the light guide plate 110. In addition, like the case shown in FIG. 2H where the light source 120 emits light from the center, a part of the yellow light YL' forms the incident yellow light YLrf' and the total-reflection yellow light YLtrl', and a part of the blue light BL' forms the incident blue light BLrf' and the total-reflection blue light BLtrl'.

In the present embodiment, although the yellow light divergence angle YLθ of the light source 120 is greater than the blue light divergence angle BLθ, in the lateral light emission of the light source 120, the proportion of the incident yellow light YLrf' in the yellow light YL' is close to that of the incident blue light BLrf' in the blue light BL', and the proportion of the total-reflection yellow light YLtrl' in the yellow light YL' is close to that of the total-reflection blue light BLtrl' in the blue light BL'. Therefore, an image presented obliquely in front of the light source 120 in the visible area VA of the display module 200 is neither warm whitish nor cool whitish.

Specifically, in the present embodiment, since the image presented directly in front of or obliquely in front of the light source 120 in the visible area VA of the display module 200 is neither warm whitish nor cool whitish, the display frame of the display module 200 is uniform in color on the light entering side. In addition, since the display module 200 employs the same light guide plate 110 and light source 120 as those in the front light module 100, the front light module 100 is capable of making a surface light source uniform in color on the light entering side, so as to render a display frame uniform in color on the light entering side.

Figure 3A:
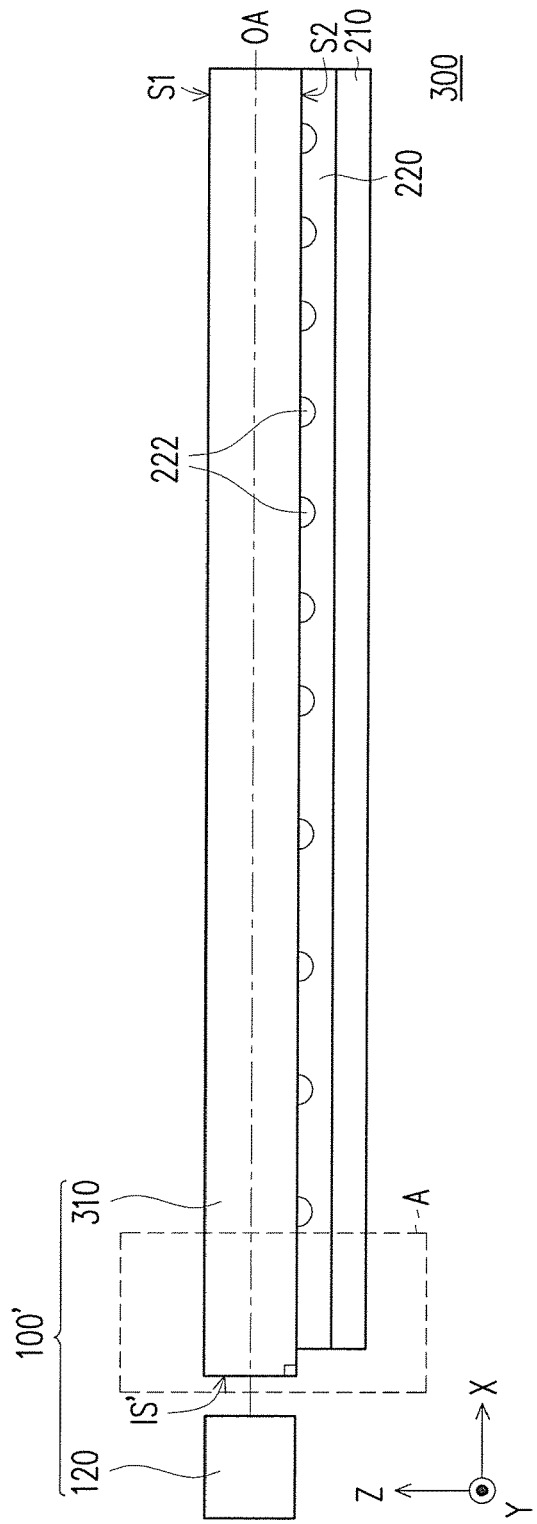
FIG. 3A is a schematic side view of a display module according to a comparative embodiment of the invention.

FIG. 3A is a schematic side view of a display module according to a comparative embodiment of the invention. Please refer to FIG. 3A. In the present comparative embodiment, a display module 300 differs from the display module 200 in that a light entering surface IS' of a light guide plate 310 of the display module 300 is a plane perpendicular to the second surface S2. Meanwhile, the optical axis OA of the light source 120 is perpendicular to the light entering surface IS'. Details of the other components of the display module 300 may be obtained by referring to the description of the display module 200, and thus are not repeated herein.

Figure 3B:
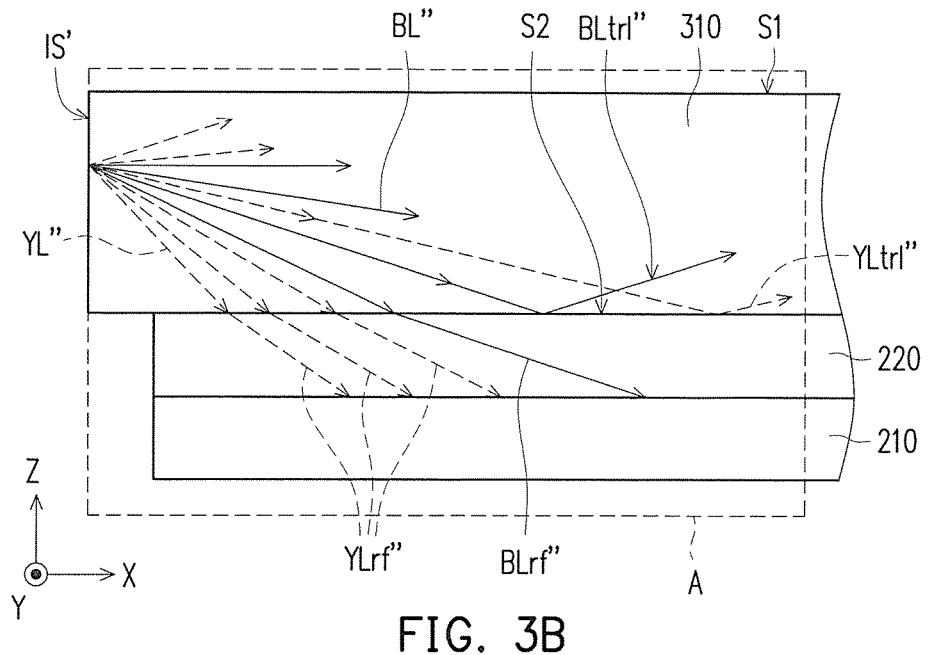
FIG. 3B is a schematic cross-sectional view of the display module in the embodiment shown in FIG. 3A along line I-I of the light source shown in FIG. 2F.

FIG. 3B is a schematic cross-sectional view of the display module in the embodiment shown in FIG. 3A along line I-I of the light source shown in FIG. 2F. FIG. 3B illustrates a portion of the non-visible area A of the display module 300 corresponding to FIG. 3A, and the portion of the non-visible area A is not in the visible area (not illustrated) of the display module 300. Please refer to FIG. 3B. In the present comparative embodiment, a blue light BL" and a yellow light YL" emitted from the light source 120 enter the light entering surface IS' of the light guide plate 310 and then diverge in the light guide plate 310 at different divergence angles.

In the present comparative embodiment, the divergence angle at which the yellow light YL" diverges in the light guide plate 310 is greater than the divergence angle at which the blue light BL" diverges in the light guide plate 310. In addition, like the case shown in FIG. 2H where the light source 120 emits light from the center, a part of the yellow light YL" forms an incident yellow light YLrf" and a total-reflection yellow light YLtrl", and a part of the blue light BL" forms an incident blue light BLrf" and a total-reflection blue light BLtrl". In the present comparative embodiment, since the yellow light divergence angle YLθ of the light source 120 is greater than the blue light divergence angle BLθ, and the light entering surface IS' of the light guide plate 310 is not inclined toward the second surface S2, the proportions of the incident yellow light YLrf" and the incident blue light BLrf" cannot be easily adjusted. Therefore, in the present comparative embodiment, the proportion of the incident yellow light YLrf" in the yellow light YL" is higher than that of the incident blue light BLrf" in the blue light BL". Meanwhile, the proportion of the total-reflection yellow light YLtrl" in the yellow light YL" is lower than that of the total-reflection blue light BLtrl" in the blue light BL". Specifically, a larger amount of the blue light BL" (total-reflection blue light BLtrl") reaches a position in the light guide plate 310 corresponding to the visible area (not illustrated) of the display module 300. Therefore, an image presented directly in front of the light source 120 in the visible area (not illustrated) of the display module 300 is cool whitish.

Figure 3C:
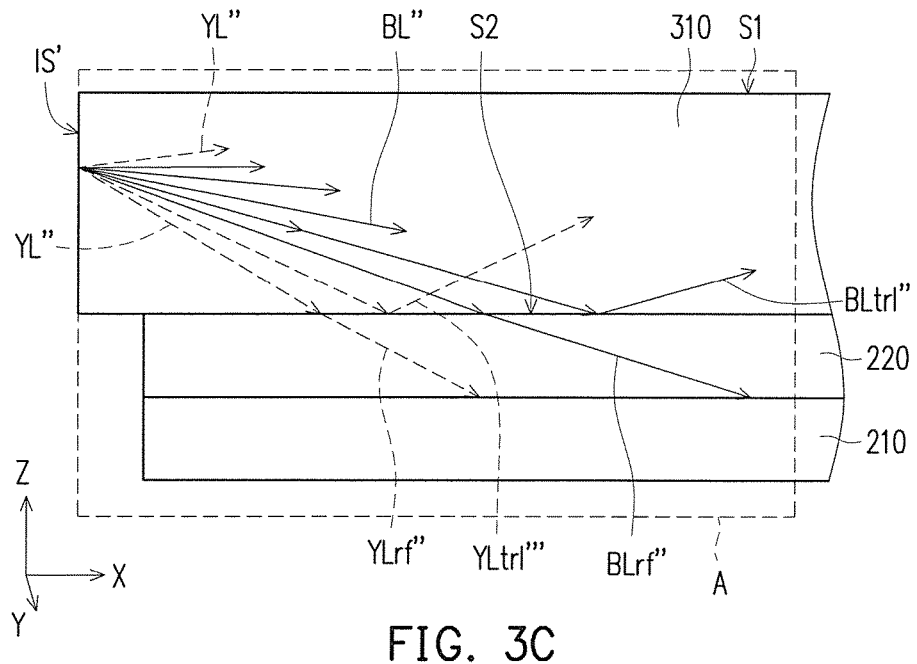
FIG. 3C is a schematic cross-sectional view of the display module in the embodiment shown in FIG. 3A along line II-II of the light source shown in FIG. 2F.

FIG. 3C is a schematic cross-sectional view of the display module in the embodiment shown in FIG. 3A along line II-II of the light source shown in FIG. 2F. In the present comparative embodiment, FIG. 3C illustrates the portion of the non-visible area A of the display module 300 corresponding to FIG. 3A, and the portion of the non-visible area A is not in the visible area (not illustrated) of the display module 300. Please refer to FIG. 3C. In the present comparative embodiment, the light emission of the light source 120 from the center has a greater degree of light divergence than the light emission of the light source 120 in the lateral direction. Therefore, the blue light divergence angle and the yellow light divergence angle of the light source 120 corresponding to the lateral light emission are both smaller than those corresponding to the light emission from the center. Specifically, in the lateral light emission of the light source 120 in FIG. 3C, the divergence angle at which the yellow light YL" diverges in the light guide plate 310 is greater than the divergence angle at which the blue light BL" diverges in the light guide plate 310. In addition, like the case shown in FIG. 3B where the light source 120 emits light from the center, a part of the yellow light YL" forms the incident yellow light YLrf" and the total-reflection yellow light YLtrl", and a part of the blue light BL" forms the incident blue light BLrf" and the total-reflection blue light BLtrl".

In the present comparative embodiment, since the yellow light divergence angle YLθ of the light source 120 is greater than the blue light divergence angle BLθ, and the light entering surface IS' of the light guide plate 310 is not inclined toward the second surface S2, the proportions of the incident yellow light YLrf" and the incident blue light BLrf" cannot be easily adjusted. Therefore, in the present comparative embodiment, the proportion of the incident yellow light YLrf" in the yellow light YL" is lower than that of the incident blue light BLrf" in the blue light BL". Meanwhile, the proportion of the total-reflection yellow light YLtrl" in the yellow light YL" is higher than that of the total-reflection blue light BLtrl" in the blue light BL". Specifically, a larger amount of the yellow light YL" (total-reflection yellow light YLtrl") reaches a position in the light guide plate 310 corresponding to the visible area (not illustrated) of the display module 300. Therefore, an image presented directly in front of the light source 120 in the visible area (not illustrated) of the display module 300 is warm whitish.

Specifically, in the present comparative embodiment, since the image presented directly in front of the light source 120 in the visible area (not illustrated) of the display module 300 is cool whitish, and the image presented obliquely in front of the light source 120 in the visible area (not illustrated) of the display module 300 is warm whitish, a display frame of the display module 300 is not uniform in color on the light entering side.

Please again refer to FIG. 2A. In FIG. 2A, the area ISA of the light entering surface IS of the light guide plate 110 of the display module 200 forms the first angle θ1 with the optical axis OA of the light source 120, and the first angle θ1 is less than 90 degrees. The blue light BL' and the yellow light YL' emitted from the light source 120 enter the light entering surface IS of the light guide plate 110 and then are deflected toward the second surface S2. Specifically, the blue light BL' and the yellow light YL' are deflected toward the second surface S2 to different extents. Therefore, directly in front of the light source 120 in the light-guide plate 110, the proportion of the incident yellow light YLrf' in the yellow light YL' and the proportion of the incident blue light BLrf' in the blue light BL' are adjusted to be close or equal, and the proportion of the total-reflection yellow light YLtrl' in the yellow light YL' and the proportion of the total-reflection blue light BLtrl' in the blue light BL' are adjusted to be close or equal. Similarly, obliquely in front of the light source 120 in the light-guide plate 110, the proportion of the incident yellow light YLrf' in the yellow light YL' and the proportion of the incident blue light BLrf' in the blue light BL' are adjusted to be close or equal, and the proportion of the total-reflection yellow light YLtrl' in the yellow light YL' and the proportion of the total-reflection blue light BLtrl' in the blue light BL' are adjusted to be close or equal. Therefore, the image presented directly in front of or obliquely in front of the light source 120 in the visible area VA of the display module 200 is neither warm whitish nor cool whitish, and thus the display frame of the display module 200 is uniform in color on the light entering side.

Figure 4A:
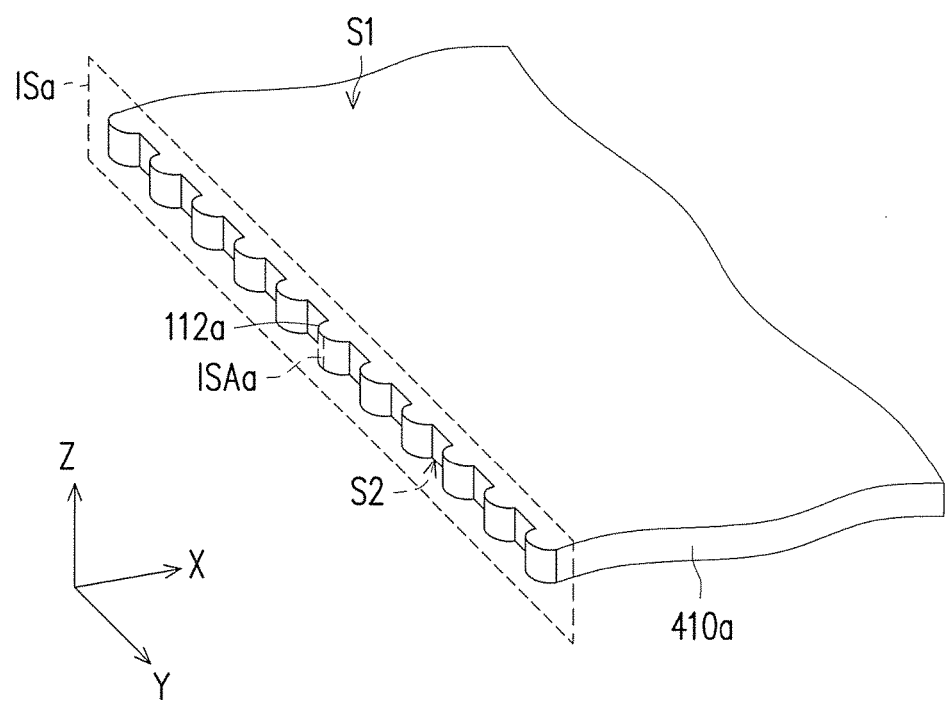
FIG. 4A is a schematic three-dimensional view of a light guide plate of a front light module according to another embodiment of the invention.
Figure 4B:
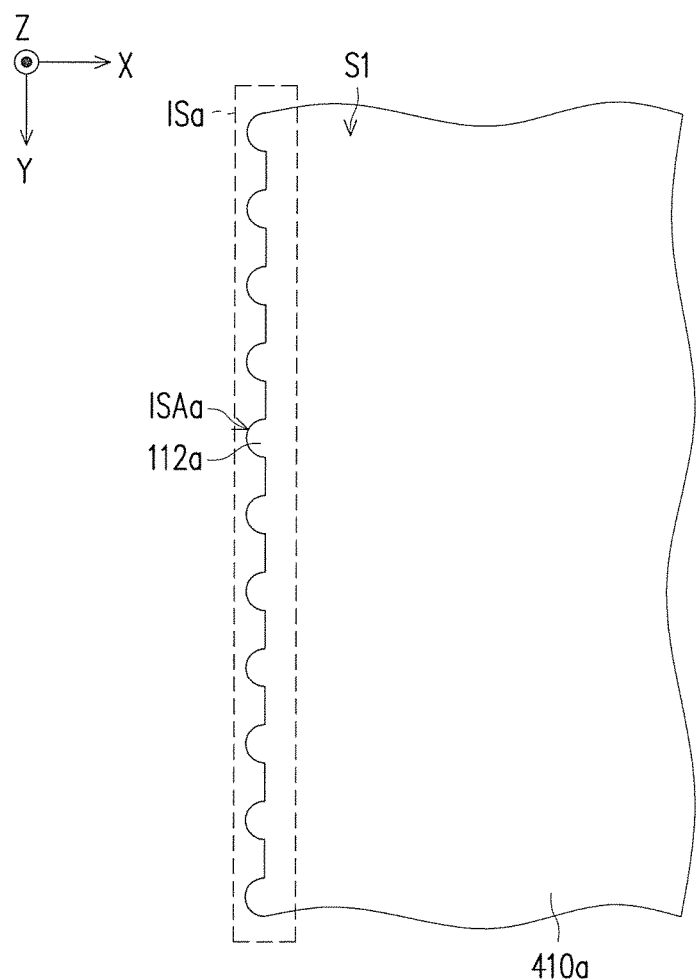
FIG. 4B is a schematic top view of the light guide plate in the embodiment shown in FIG. 4A.
Figure 4C:
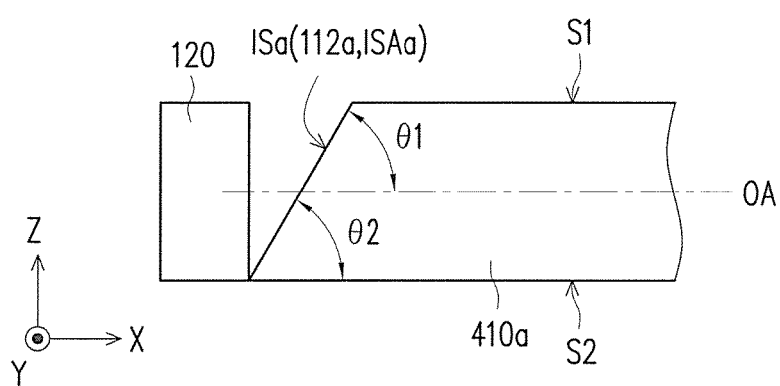
FIG. 4C is a schematic side view of the light guide plate in the embodiment shown in FIG. 4A.

FIG. 4A is a schematic three-dimensional view of a light guide plate of a front light module according to another embodiment of the invention, FIG. 4B is a schematic top view of the light guide plate in the embodiment shown in FIG. 4A, and FIG. 4C is a schematic side view of the light guide plate in the embodiment shown in FIG. 4A. Please refer to FIGS. 4A to 4C. In the present embodiment, a light guide plate 410a is similar to the light guide plate 110 in the embodiment shown in FIG. 2A. Details of the relevant components and functions of the light guide plate 410a may be obtained by referring to the description of the light guide plate 110, and thus are not repeated herein. The light guide plate 410a differs from the light guide plate 110 in that a light entering surface ISa of the light guide plate 410a includes at least one first microstructure 112a protruding from or recessed into the light entering surface ISa. The first microstructure 112a includes an area ISAa adjacent to the first surface S1 and the second surface S2. Specifically, the light guide plate 410a includes a plurality of first microstructures 112a having a semi-cylindrical shape and protruding from the light entering surface ISa. However, in some embodiments, these first microstructures 112a may have a shape of a portion of a cylinder, a portion of a prism or a portion of a cone, and these first microstructures 112a protrude from or are recessed into the light entering surface ISa. In addition, in the present embodiment, every two adjacent ones among these first microstructures 112a are connected to each other. However, in some other embodiments, every two adjacent ones among these first microstructures 112a may not be connected to each other. In addition, in some embodiments, the light entering surface of the light guide plate may also include only one first microstructure protruding from or recessed into the light entering surface. The invention is not limited thereto.

Figure 5A:
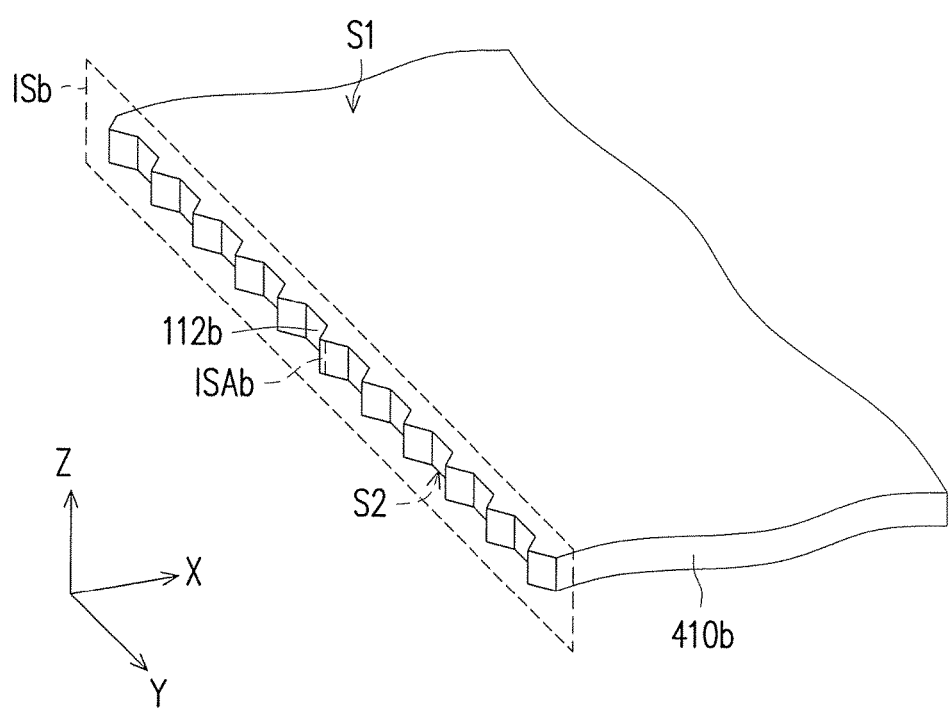
FIG. 5A is a schematic three-dimensional view of a light guide plate of a front light module according to still another embodiment of the invention.
Figure 5B:
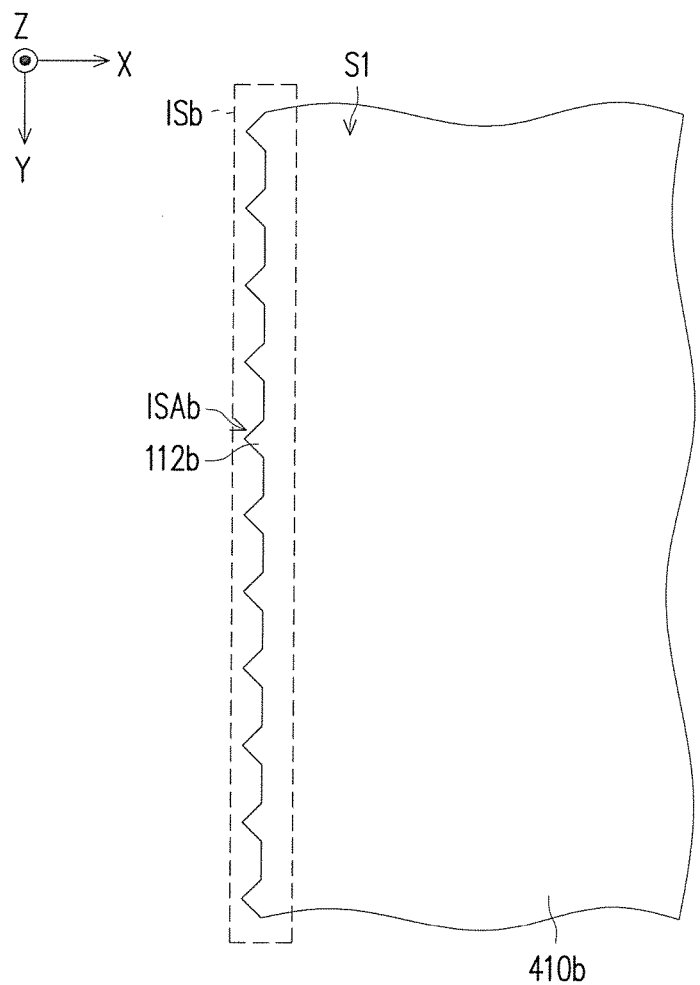
FIG. 5B is a schematic top view of the light guide plate in the embodiment shown in FIG. 5A.
Figure 5C:
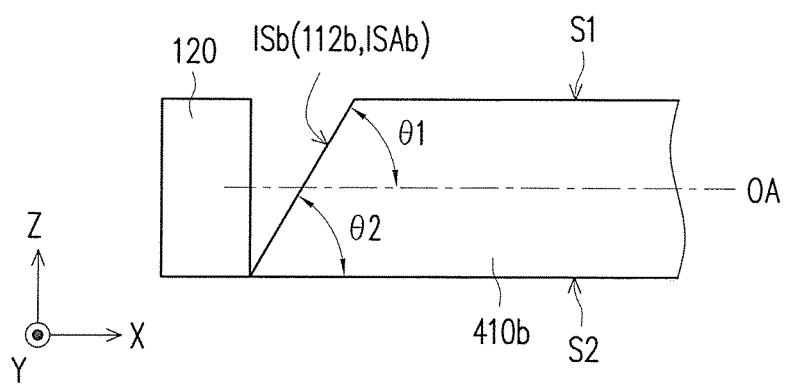
FIG. 5C is a schematic side view of the light guide plate in the embodiment shown in FIG. 5A.

FIG. 5A is a schematic three-dimensional view of a light guide plate of a front light module according to still another embodiment of the invention, FIG. 5B is a schematic top view of the light guide plate in the embodiment shown in FIG. 5A, and FIG. 5C is a schematic side view of the light guide plate in the embodiment shown in FIG. 5A. Please refer to FIGS. 5A to 5C. In the present embodiment, a light guide plate 410b is similar to the light guide plate 410a in the embodiment shown in FIG. 4A. Details of the relevant components and functions of the light guide plate 410b may be obtained by referring to the description of the light guide plate 410a, and thus are not repeated herein. The light guide plate 410b differs from the light guide plate 410a in that a plurality of first microstructures 112b of a light entering surface ISb of the light guide plate 410b have a shape of a portion of a prism and protrude from the light entering surface ISb. The first microstructure 112b includes an area ISAb adjacent to the first surface S1 and the second surface S2.

Specifically, the light guide plate 410a in the embodiment shown in FIG. 4A is at least applicable to the front light module 100 shown in FIG. 1 and the display module 200 shown in FIG. 2A. In addition, the light guide plate 410b in the embodiment shown in FIG. 5A is also at least applicable to the front light module 100 shown in FIG. 1 and the display module 200 shown in FIG. 2A. In these embodiments, the area ISAa of the light entering surface ISa of the light guide plate 410a forms the first angle θ1 with the optical axis OA of the light source 120, and the first angle θ1 is less than 90 degrees. Therefore, the blue light and the yellow light emitted from the light source 120 enter the light entering surface ISa of the light guide plate 410a and then are deflected toward the second surface S2. Similarly, an area ISAb of a light entering surface ISb of the light guide plate 410b forms the first angle θ1 with the optical axis OA of the light source 120, and the first angle θ1 is less than 90 degrees. Therefore, the blue light and the yellow light emitted from the light source 120 enter the light entering surface ISb of the light guide plate 410b and then are deflected toward the second surface S2. Thus, in these embodiments, similar to the light guide plate 110, the light guide plates 410a and 410b have an effect of deflecting light. Specifically, a front light module that employs the light guide plate 410a or the light guide plate 410b is capable of making a surface light source uniform in color on the light entering side, so as to render a display frame uniform in color on the light entering side. In addition, a display module that employs the light guide plate 410a or the light guide plate 410b has a display frame uniform in color on the light entering side.

FIGS. 6A to 6F are schematic three-dimensional views of light guide plates of front light modules according to other embodiments of the invention. Please first refer to FIGS. 6A and 6B. In the present embodiment, light guide plates 410c and 410d are both similar to the light guide plate 410a in the embodiment shown in FIG. 4A. Details of the relevant components and functions of the light guide plates 410c and 410d may be obtained by referring to the description of the light guide plate 410a, and thus are not repeated herein. The light guide plates 410c and 410d differ from the light guide plate 410a in that a plurality of first microstructures 112c and 112d of light entering surfaces ISc and ISd of the light guide plates 410c and 410d have a shape of a portion of a cone, and these first microstructures 112c and 112d respectively protrude from the light entering surfaces ISc and ISd. In addition, the first microstructures 112c and 112d respectively include areas ISAb and ISAd, and the areas ISAb and ISAd are both adjacent to the first surface S1 and the second surface S2. In some embodiments, the first microstructures 112c and 112d have a shape of a portion of a cone, a vertex of the cone being connected to the first surface S1 and a bottom surface of the cone being connected to the second surface S2. In other embodiments, it may be that the vertex of the cone is connected to the second surface S2 and the bottom surface is connected to the first surface S1. The invention is not limited thereto. Specifically, the light guide plates 410c and 410d are at least applicable to the front light module 100 and the display module 200, and have a similar function to that of the light guide plates 110, 410a and 410b.

Figure 6A:
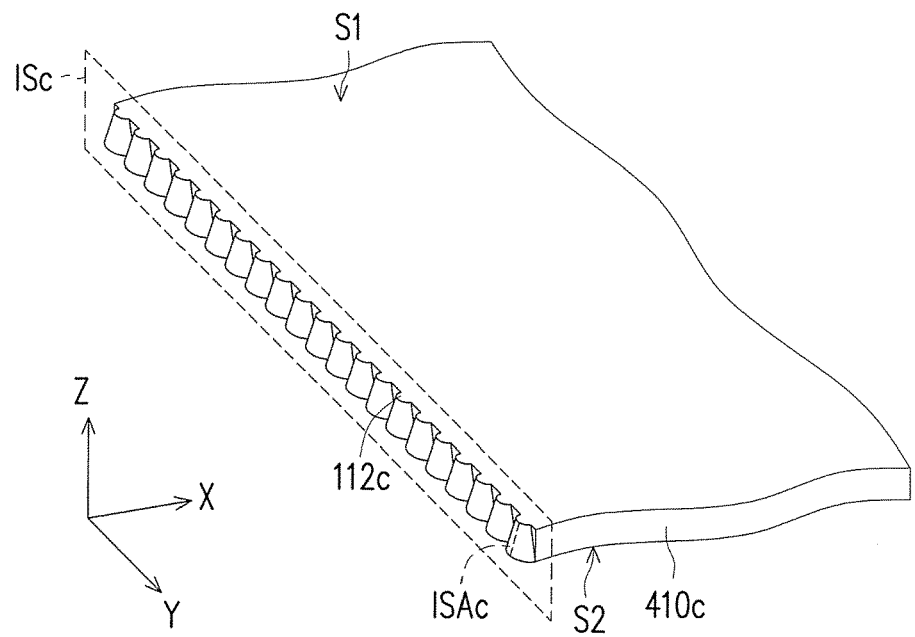
FIGS. 6A to 6F are schematic three-dimensional views of light guide plates of front light modules according to other embodiments of the invention.
Figure 6B:
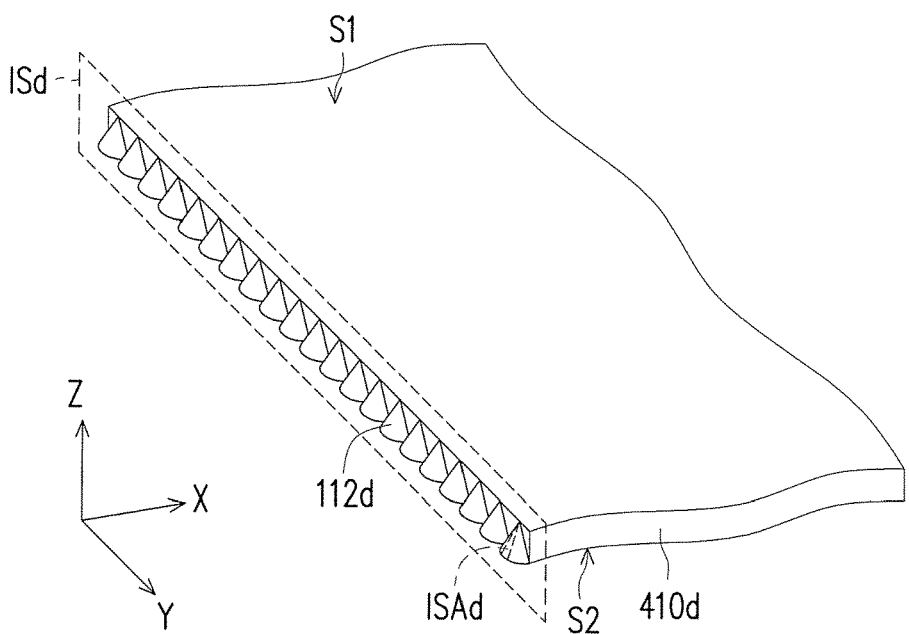
Figure 6C:
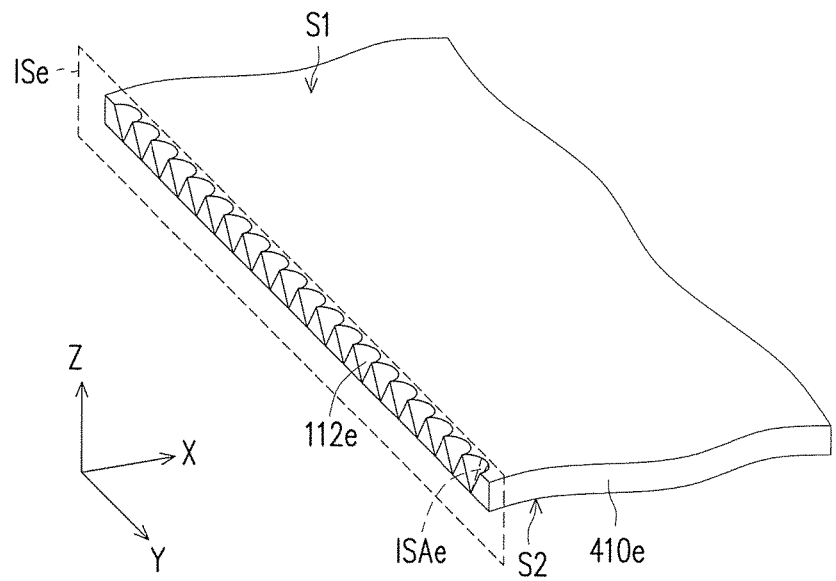

Next, please refer to FIG. 6C. In the present embodiment, a light guide plate 410e is similar to the light guide plate 410d in FIG. 6B. The light guide plate 410e differs from the light guide plate 410d in that a plurality of first microstructures 112e of a light entering surface ISe of the light guide plate 410e have a shape of a portion of a cone, a vertex of the cone being connected to the second surface S2 and a bottom surface of the cone being connected to the first surface S1. In addition, these first microstructures 112e are recessed into the light entering surface ISe. The first microstructure 112e includes an area ISAe adjacent to the first surface S1 and the second surface S2. Specifically, the light guide plate 410e is at least applicable to the front light module 100 and the display module 200, and has a similar function to that of the light guide plates 110, 410a, 410b, 410c and 410d.

Figure 6D:
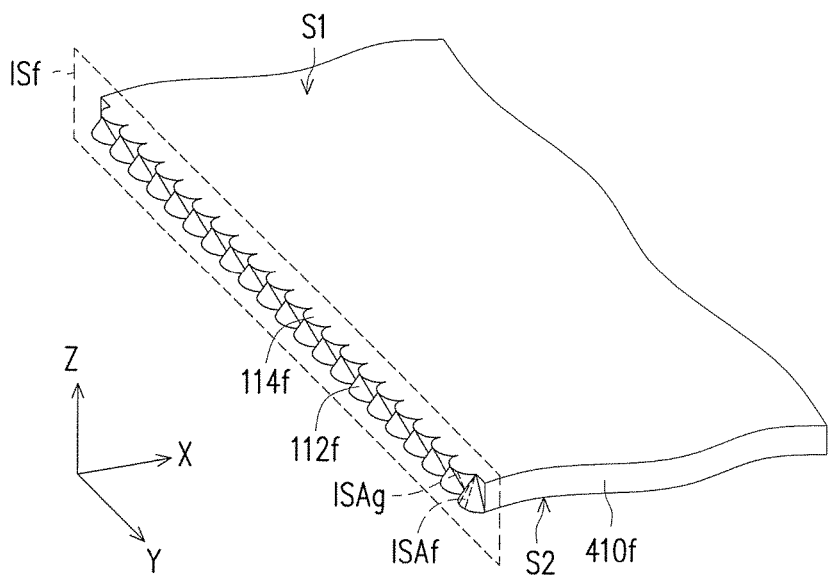

Next, please refer to FIG. 6D. In the present embodiment, a light guide plate 410f is similar to the light guide plate 410d in FIG. 6B. Details of the relevant components and functions of the light guide plate 410f may be obtained by referring to the description of the light guide plate 410d, and thus are not repeated herein. The light guide plate 410f differs from the light guide plate 410d in that a light entering surface ISf of the light guide plate 410f includes a plurality of first microstructures 112f protruding from the light entering surface ISf. The first microstructure 112f includes an area ISAf adjacent to the first surface S1 and the second surface S2. In addition, the light entering surface ISf of the light guide plate 410f further includes a plurality of second microstructures 114f protruding from the light entering surface ISf. The second microstructure 114f includes another area ISAg. In the present embodiment, the plurality of first microstructures 112f and the plurality of second microstructures 114f are alternately arranged in a row. These first microstructures 112f have a shape of a portion of a cone, a vertex of the cone being connected to the first surface S1 and a bottom surface of the cone being connected to the second surface S2. In addition, these second microstructures 114f also have a shape of a portion of a cone, a vertex of the cone being connected to the second surface S2 and a bottom surface of the cone being connected to the first surface S1.

Please refer to FIG. 6D. In some embodiments, the first microstructure 112f and the second microstructure 114f may have a shape of a portion of a cylinder, a portion of a prism or other shapes, and the first microstructure 112f and the second microstructure 114f may protrude from or be recessed into the light entering surface ISa. The invention is not limited thereto. In addition, in some other embodiments, the adjacent first microstructures 112f and the adjacent second microstructures 114f may be connected or not connected to each other. The invention is not limited thereto. Specifically, the light guide plate 410f is at least applicable to the front light module 100 and the display module 200, and has a similar function to that of the light guide plates 110, 410a, 410b, 410c, 410d and 410e.

Figure 6E:
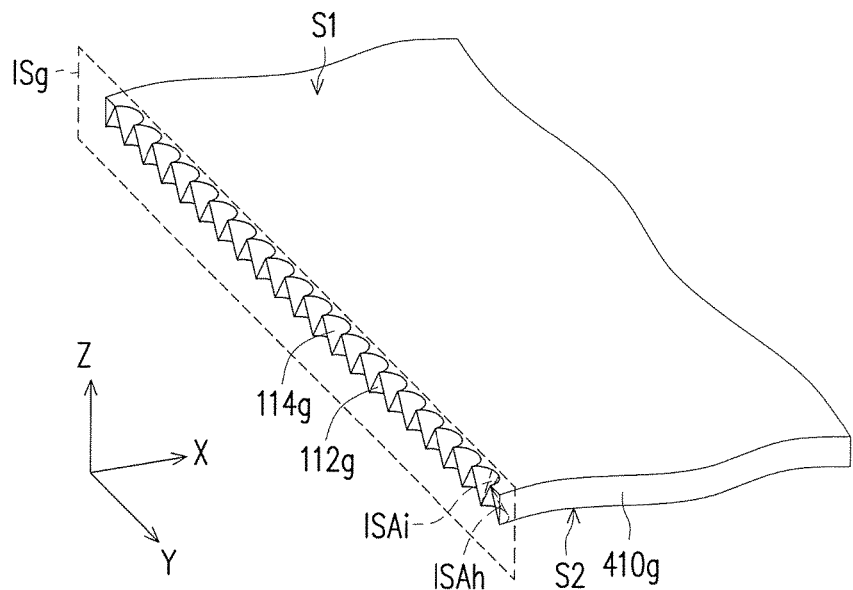

Next, please refer to FIG. 6E. In the present embodiment, a light guide plate 410g is similar to the light guide plate 410f in FIG. 6D. The light guide plate 410g differs from the light guide plate 410f in that a plurality of first microstructures 112g of a light entering surface ISg of the light guide plate 410g are recessed into the light entering surface ISg. The first microstructure 112g includes an area ISAh adjacent to the first surface S1 and the second surface S2. In addition, a plurality of second microstructures 114g of the light entering surface ISg of the light guide plate 410g are recessed into the light entering surface ISg. The second microstructure 114g includes an area ISAi adjacent to the first surface S1 and the second surface S2. Specifically, the light guide plate 410g is at least applicable to the front light module 100 and the display module 200, and has a similar function to that of the light guide plates 110, 410a, 410b, 410c, 410d, 410e and 410f.

Figure 6F:
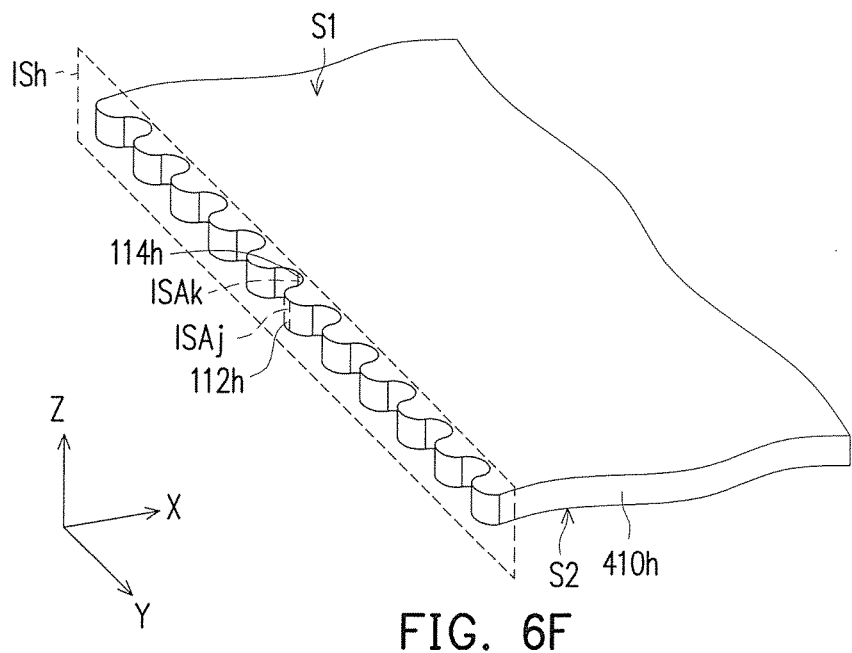

Next, please refer to FIG. 6F. In the present embodiment, a light guide plate 410h is similar to the light guide plate 410f in FIG. 6D. The light guide plate 410h differs from the light guide plate 410f in that a plurality of first microstructures 112h of a light entering surface ISh of the light guide plate 410h have a shape of a portion of a cylinder and protrude from the light entering surface ISh. The first microstructure 112h includes an area ISAj adjacent to the first surface S1 and the second surface S2. In addition, a plurality of second microstructures 114h of the light entering surface ISh of the light guide plate 410h also have a shape of a portion of a cylinder and are recessed into the light entering surface ISh. The second microstructure 114h includes another area ISAk adjacent to the first surface S1 and the second surface S2. Specifically, the light guide plate 410h is at least applicable to the front light module 100 and the display module 200, and has a similar function to that of the light guide plates 110, 410a, 410b, 410c, 410d, 410e, 410f and 410g.

In summary, the light entering surface of the light guide plate of the front light module according to an embodiment of the invention has at least one area adjacent to the first surface and the second surface of the light guide plate. The at least one area and the optical axis of the light source form the first angle. The first angle is less than 90 degrees. Therefore, the front light module is capable of making a surface light source uniform in color on the light entering side, so as to render a display frame uniform in color on the light entering side. In addition, the light entering surface of the light guide plate of the display module according to an embodiment of the invention has at least one area adjacent to the first surface and the second surface of the light guide plate. The at least one area and the optical axis of the light source form the first angle. The first angle is less than 90 degrees. Therefore, a display frame of the display module is uniform in color on the light entering side.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A front light module, comprising:
    a light guide plate, comprising:
        a first surface;
        a second surface opposite the first surface; and
        a light entering surface having an area adjacent to the first surface and the second surface; and
    a light source disposed beside the light entering surface and configured to illuminate the light guide plate, wherein the area and an optical axis of the light source form a first angle less than 90 degrees, wherein the light source emits a first light which forms a first light divergence angle, wherein the light source emits a second light which forms a second light divergence angle, and the first light divergence angle is smaller than the second divergence angle,
    wherein the light entering surface comprises a first microstructure protruding from or recessed into the light entering surface and a second microstructure protruding from or recessed into the light entering surface, and the first microstructure comprises the area,
    wherein the first microstructure and the second microstructure are alternately arranged in a row, wherein the first microstructure has a shape of a portion of a cone, a vertex of the cone being connected to the first surface and a bottom surface of the cone being connected to the second surface, the second microstructure has a shape of a portion of a cone, a vertex of the cone being connected to the second surface and a bottom surface of the cone being connected to the first surface.

2. The front light module of claim 1, wherein the first angle ranges from 50 to 85 degrees.

3. The front light module of claim 1, wherein the light entering surface and the second surface form a second angle ranging from 50 to 85 degrees.

4. The front light module of claim 3, wherein the first surface and the second surface are substantially parallel to each other.

5. The front light module of claim 1, wherein the light source is a light-emitting diode (LED).

6. The front light module of claim 1, wherein the light entering surface is a plane.

7. The front light module of claim 1, wherein the first microstructure is a plurality of first microstructures connected or not connected to one another.

8. A display module, comprising:
    a reflective display panel;
    a light guide plate disposed on the reflective display panel, the light guide plate comprising:
        a first surface;
        a second surface opposite the first surface, wherein one of the first surface and the second surface faces the reflective display panel and the other faces away from the reflective display panel; and
        a light entering surface having an area adjacent to the first surface and the second surface; and
    a light source disposed beside the light entering surface and configured to illuminate the light guide plate, wherein the area and an optical axis of the light source form a first angle less than 90 degrees, wherein the light source emits a first light which forms a first light divergence angle, wherein the light source emits a second light which forms a second light divergence angle, and the first light divergence angle is smaller than the second divergence angle,
    wherein the light entering surface comprises a first microstructure protruding from or recessed into the light entering surface and a second microstructure protruding from or recessed into the light entering surface, and the first microstructure comprises the area,
    wherein the first microstructure and the second microstructure are alternately arranged in a row, wherein the first microstructure has a shape of a portion of a cone, a vertex of the cone being connected to the first surface and a bottom surface of the cone being connected to the second surface, the second microstructure has a shape of a portion of a cone, a vertex of the cone being connected to the second surface and a bottom surface of the cone being connected to the first surface.

9. The display module of claim 8, wherein the first angle ranges from 50 to 85 degrees.

10. The display module of claim 8, wherein the light entering surface and the second surface form a second angle ranging from 50 to 85 degrees.

11. The display module of claim 10, wherein the first surface and the second surface are substantially parallel to each other.

12. The display module of claim 8, wherein the light entering surface is a plane.

13. The display module of claim 8, wherein the first microstructure is a plurality of first microstructures connected or not connected to one another.

14. The display module of claim 8, further comprising an adhesive layer disposed between the reflective display panel and the light guide plate and configured to fix the reflective display panel and the light guide plate, wherein the adhesive layer has a refractive index smaller than that of the light guide plate.

15. The display module of claim 14, wherein the one of the first surface and the second surface that faces the reflective display panel comprises a plurality of microstructures protruding from or recessed into the one of the first surface and the second surface.

16. A front light module, comprising:
    a light guide plate, comprising:
        a first surface;
        a second surface opposite the first surface; and
        a light entering surface having an area adjacent to the first surface and the second surface; and
    a light source disposed beside the light entering surface and configured to illuminate the light guide plate, wherein the area and an optical axis of the light source form a first angle less than 90 degrees, wherein the light source emits a first light with a first wavelength which forms a first light divergence angle, wherein the light source emits a second light with a second wavelength which forms a second light divergence angle, the first wavelength is shorter than the second wavelength and the first light divergence angle is smaller than the second divergence angle.

* * * * *